US009013733B2

(12) United States Patent
Fujiwara

(10) Patent No.: US 9,013,733 B2
(45) Date of Patent: Apr. 21, 2015

(54) IMAGE READING APPARATUS

(71) Applicant: Takashi Fujiwara, Nagakute (JP)

(72) Inventor: Takashi Fujiwara, Nagakute (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/038,939

(22) Filed: Sep. 27, 2013

(65) Prior Publication Data

US 2014/0168686 A1 Jun. 19, 2014

(30) Foreign Application Priority Data

Dec. 14, 2012 (JP) ................................ 2012-273399

(51) Int. Cl.
*H04N 1/00* (2006.01)
*B65H 5/26* (2006.01)
*B65H 5/00* (2006.01)

(52) U.S. Cl.
CPC ....... *H04N 1/00084* (2013.01); *H04N 1/00591* (2013.01); *B65H 5/00* (2013.01); *B65H 2301/5321* (2013.01); *B65H 2402/441* (2013.01); *B65H 2601/11* (2013.01); *B65H 2801/39* (2013.01)

(58) Field of Classification Search
USPC .......... 358/1.14, 496, 498, 1.1, 1.4, 1.5, 1.13, 358/1.15, 474, 482, 483, 497; 271/18, 110, 271/121, 208, 225; 399/107, 111
See application file for complete search history.

(56) References Cited

U.S. PATENT DOCUMENTS

| | | | | |
|---|---|---|---|---|
| 5,669,042 | A * | 9/1997 | Kobayashi et al. | 399/111 |
| 7,079,294 | B1 * | 7/2006 | Nakagawa et al. | 358/496 |
| 7,502,146 | B2 * | 3/2009 | Hanashi et al. | 358/483 |
| 2007/0133039 | A1 * | 6/2007 | Yamada | 358/1.14 |
| 2011/0020034 | A1 * | 1/2011 | Tsutsumi | 399/128 |
| 2011/0242623 | A1 | 10/2011 | Akimatsu | |

FOREIGN PATENT DOCUMENTS

| | | |
|---|---|---|
| JP | 2006-333003 A | 12/2006 |
| JP | 2011-211480 A | 10/2011 |

* cited by examiner

*Primary Examiner* — Allen H Nguyen
(74) *Attorney, Agent, or Firm* — Banner & Witcoff, Ltd.

(57) ABSTRACT

An image reading apparatus includes a reading unit which reads an image on a document while being conveyed, a cover movable between an opened position where the reading unit is opened and a closed position where the reading unit is covered, a metal pressing member held by the cover and configured to face the reading unit and press the document toward the reading unit when the cover is at the closed position, a metal frame supporting the conveyor and configured to face the pressing member when the cover is at the closed position, and a ground member directly connected to the frame and configured to be separated from the pressing member when the cover is at the opened position, and to be in contact with the pressing member when the cover is at the closed position.

12 Claims, 9 Drawing Sheets

3

IMAGE READING APPARATUS

CROSS-REFERENCE TO RELATED APPLICATION

This application claims priority from Japanese Patent Application No. 2012-273399, filed on Dec. 14, 2012, the entire subject matter of which is incorporated herein by reference.

TECHNICAL FIELD

Aspects of the present invention relate to an image reading apparatus.

BACKGROUND

JP-A-2006-333003 discloses an image reading apparatus which can read images on both surfaces of a document while the document is conveyed in a document conveyance path.

This image reading apparatus includes a document holding tray and a document discharge tray which are arranged in an upper-lower direction. The document conveyance path is formed between the document holding tray and the document discharge tray, and a middle portion (curved portion) of the document conveyance path is curved. The conveyance direction of the document which is conveyed along the document conveyance path is turned to an opposite direction in the curved portion. A portion of the document conveyance path extending from the curved portion toward the document discharge tray passes through a first document reading unit and a second document reading units in order. The first document reading unit is arranged at an upper side of the document conveyance path. The second document reading unit is arranged at a lower side of the document conveyance path. The image on one surface of the document is read by the first image reading unit and the image on the other surface of the document is read by the second image reading unit while the document is conveyed from the document holding tray to the document discharge tray along the document conveyance path.

In image forming apparatuses, a document conveyed in a conveyance path is jammed in the vicinity of a document reading unit. Therefore, it is advantageous that the image reading apparatus has a configuration in which document jamming caused in the vicinity of the document reading unit is easily removed.

Further, when a document passes between the document reading unit and a pressing member, electric charges would be accumulated in the reading unit and the pressing member due to rubbing with the document. Those electric charges might cause a negative effect to quality of the image reading by the reading unit.

SUMMARY

Accordingly, an aspect of the present invention provides an image reading apparatus which may easily remove jamming of a document caused in the vicinity of a reading unit and may release electric charges in the vicinity of the reading unit.

According to an illustrative embodiment of the present invention, there is provided an image reading apparatus including a conveyor, a first reading unit, a cover, a metal pressing member, a metal frame and a ground member. The conveyor is configured to convey a document along a conveyance path. The first reading unit is configured to read an image on the document which is conveyed in a predetermined conveyance direction in the conveyance path. The cover is disposed to be movable between an opened position where the first reading unit is opened and a closed position where the first reading unit is covered. The metal pressing member held by the cover and configured to face the first reading unit with the conveyance path interposed therebetween and press the document toward the first reading unit when the cover is at the closed position. The metal frame supporting the conveyor and configured to face the pressing member in a width direction orthogonal to the conveyance direction when the cover is at the closed position. The ground member directly connected to the frame and configured to be separated from the pressing member when the cover is at the opened position, and to be in contact with the pressing member when the cover is at the closed position.

According to the above configuration, document jamming caused in the vicinity of the reading unit may be easily removed by displacing the cover from the closed position to the opened position. When the cover is at the closed position, the document may be pressed toward the first reading unit by the pressing member. Also, when the cover is at the closed position, electric charges may be released from the first reading unit and the pressing member to the frame via the ground member. Accordingly, the image of the document may be read in high quality by the reading unit.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, illustrative embodiments of the present invention will be described in detail referring to the accompanying drawings.

<External Configuration>

Figure 1:
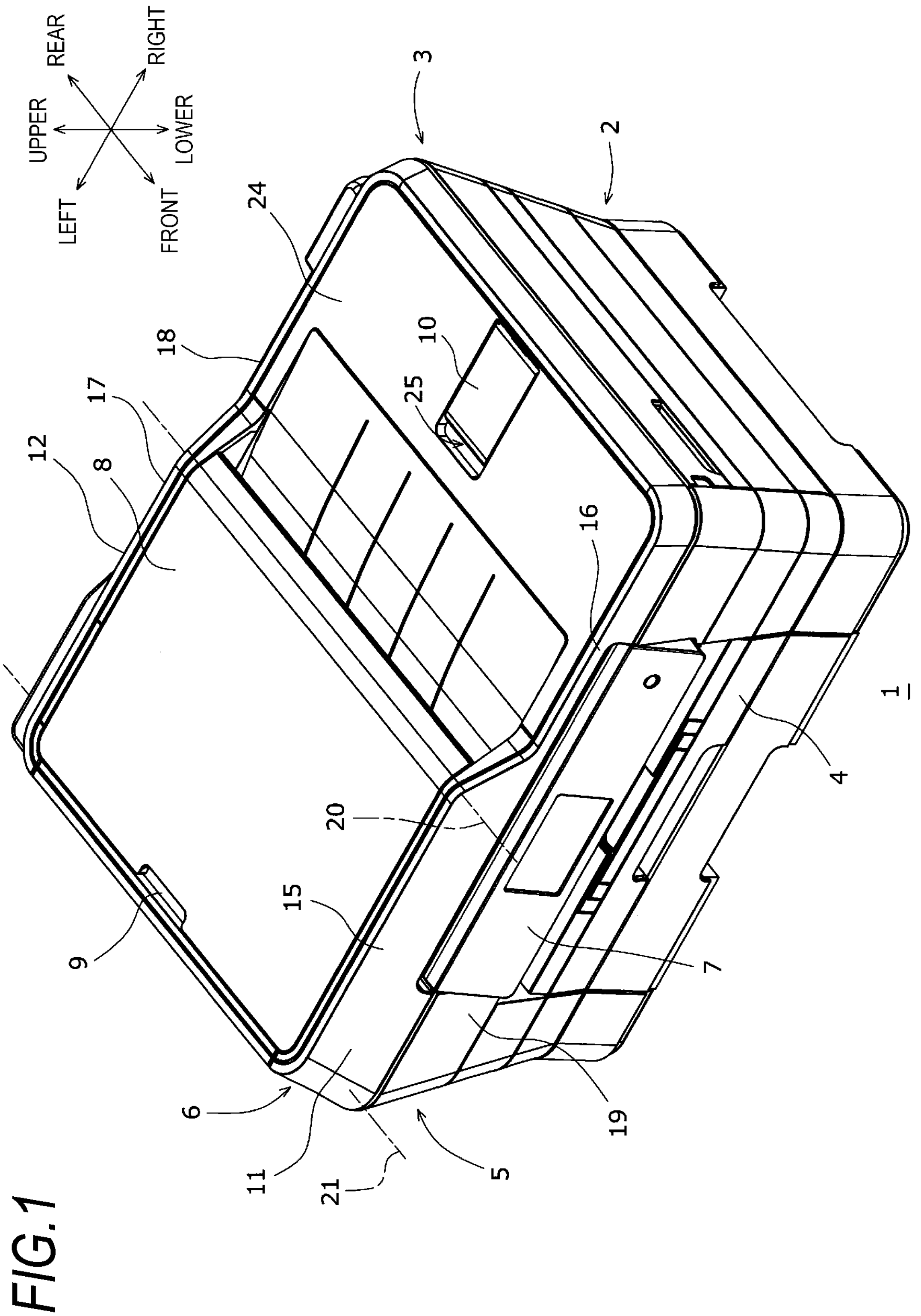
FIG. 1 is a perspective view of a multifunction printer 1 which includes an image reading apparatus 3 according to a first illustrative embodiment of the present invention when viewed from a front upper right side.

As shown in FIG. 1, a multifunction printer 1 according to an illustrative embodiment includes an image forming apparatus 2 and an image reading apparatus 3.

The image forming apparatus 2 includes a feed cassette 4 which is configured to accommodate sheets. In this illustrative embodiment, the multifunction printer 1 includes a feed cassette of two stages in an upper-lower direction. The image forming apparatus 2 may employ an inkjet method in which fine droplets of ink are ejected directly onto the sheet which is conveyed from the feed cassette 4 to form an image on the sheet. The image forming apparatus 2 may employ an electrophotographic method in which a toner image is transferred and fixed onto the sheet which is conveyed from the feed cassette 4 to form an image on the sheet.

The image reading apparatus 3 includes a scanner housing 5, an ADF housing 6, an operation panel 7, a tray 8, a maintenance cover 9 (example of a cover), and a stopper 10.

In the description hereinafter, a side of the ADF housing 6 with respect to the scanner housing 5 is referred to as an upper side, and a side of the operation panel 7 with respect to the center of the scanner housing 5 in a plan view is referred to as a front side in defining each of upper-lower, left-right and front-rear directions. In each figures from FIG. 1, the directions are shown with arrows.

The scanner housing 5 is arranged on an upper side of the image forming apparatus 2.

The ADF housing 6 includes a front side plate 11 and a rear side plate 12. The front side plate 11 and the rear side plate 12 are spaced from each other in the front-rear direction. A left side portion 15 which is approximately the left half of the front side plate 11 has a dimension in the upper-lower direction larger than a dimension of a right side portion 16 which is the rest. Therefore, an upper end of the left side portion 15 is placed at a position higher than an upper end of the right side portion 16. Also, a left side portion 17 which is approximately the left half of the rear side plate 12 has a dimension in the upper-lower direction larger than a dimension of a right side portion 18 which is the rest of the rear side plate 12. Therefore, an upper end of the left side portion 17 is placed at a position higher than an upper end of the right side portion 18. Also, each of the front side plate 11 and the rear side plate 12 is inclined inward in the front-rear direction toward the upper direction, so that the image reading apparatus 3 appears compact.

The operation panel 7 is disposed on a front surface 19 of the scanner housing 5. The operation panel 7 is operated for various user settings, receives information inputs, and transmits the information which is input to a control unit (not shown) which controls the entire multifunction printer 1. Also, the operation panel 7 includes a display unit which displays information such as the settings.

The tray 8 is laid between the left side portion 15 of the front side plate 11 and the left side portion 17 of the rear side plate 12. The tray 8 is disposed to be pivotable about a pivot axis 20 between a cover position shown in FIG. 1 and a tray position shown in FIG. 2. The pivot axis 20 extends in the front-rear direction between the respective upper right end portions of the left side portions 15 and 17. In the cover position, the tray 8 extends along the respective upper end edges of the left side portions 15 and 17, and covers an upper side of the maintenance cover 9. In the tray position, the tray 8 extends in an upper right direction from the respective right end portions of the left side portions 15 and 17.

The maintenance cover 9 is laid between the left side portion 15 of the front side plate 11 and the left side portion 17 of the rear side plate 12. The maintenance cover 9 is disposed to be pivotable about a pivot axis 21 between a closed position shown in FIG. 3 and an opened position shown in FIG. 4. The pivot axis 21 extends in the front-rear direction between the respective lower left end portions of the left side portions 15 and 17. The maintenance cover 9 includes a side portion 22 which extends along left end edges of the left side portions 15 and 17, and an upper portion 23 which extends along the upper end edges of the left side portions 15 and 17 from an upper end of the side portion 22, in the closed position. The side portion 22 is inclined inward in the front-rear direction toward the upper side, so that the image reading apparatus 3 appears compact. When the maintenance cover 9 is at the opened position, the upper portion 23 extends in an approximately upper-lower direction.

The stopper 10 is disposed in a recessed portion 25 which is formed in an upper surface 24 of the ADF housing 6. The stopper 10 is disposed to be pivotable about a pivot axis between an accommodated position and an opened position. The pivot axis extends in the front-rear direction in a right end portion of the recessed portion 25. In the accommodated position, the stopper 10 is accommodated in the recessed portion 25. In the opened position, the stopper 10 extends in an upper right direction from the right end portion of the recessed portion 25.

<Internal Configuration>

Figure 2:
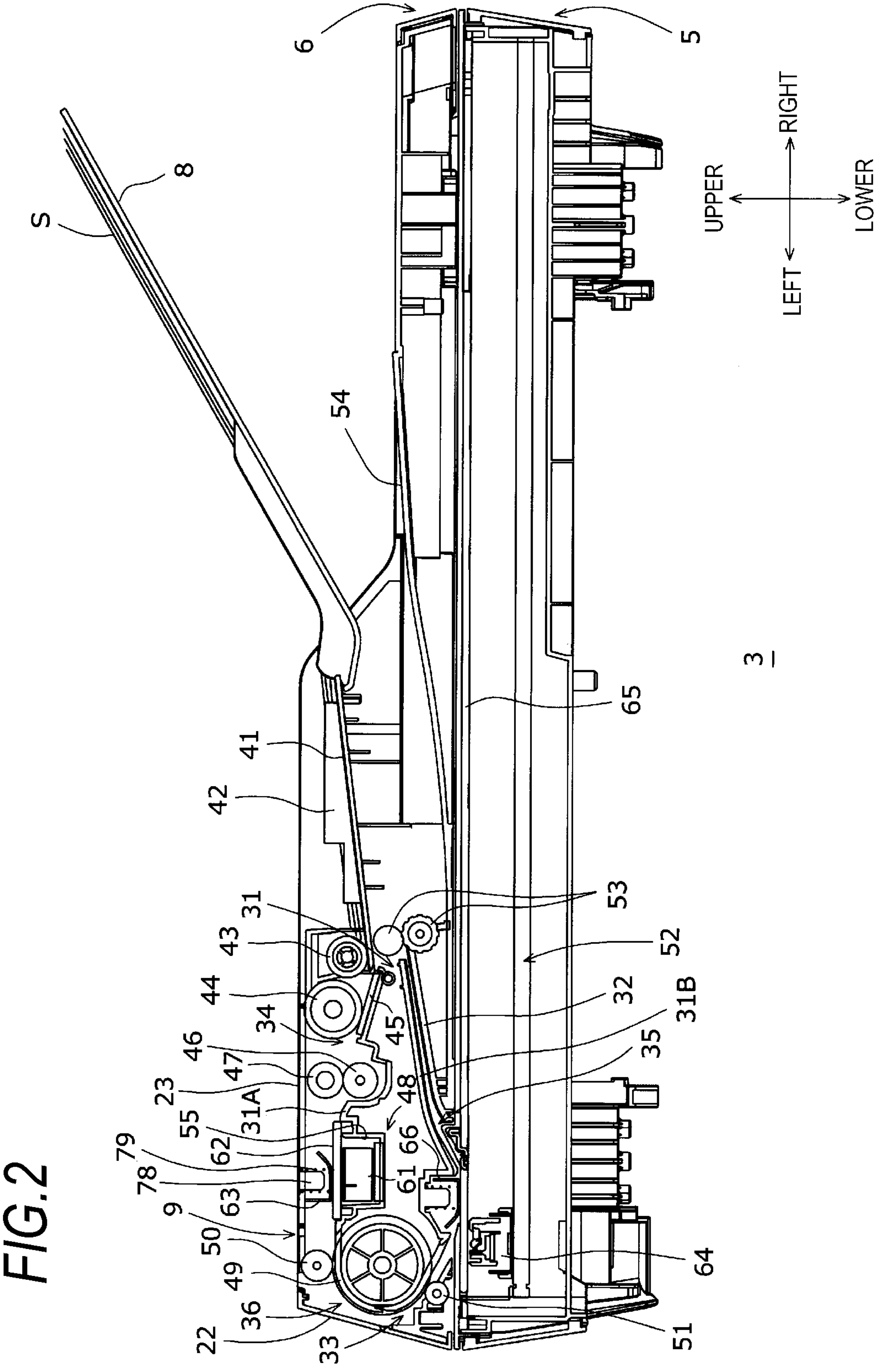
FIG. 2 is a cross-sectional view of the image reading apparatus 3.

As shown in FIG. 2, the ADF housing 6 includes an inner frame 31 and a lower frame 32. The lower frame 32 is disposed at a lower side of the inner frame 31.

The inner frame 31 is disposed at a lower side of the upper portion 23 of the maintenance cover 9 at the closed position. The inner frame 31 includes an upper side inner frame 31A and a lower side inner frame 31B. The upper side inner frame 31A and the lower side inner frame 31B are arranged to overlap with each other in the upper-lower direction between the maintenance cover 9 and the lower frame 32.

A space is formed between an inner surface of the maintenance cover 9 and the upper side inner frame 31A. Also, a space is formed between the lower side inner frame 31B and the lower frame 32. Accordingly, a conveyance path 33 along which a sheet S is conveyed is formed between the inner surface of the maintenance cover 9 and the upper side inner frame 31A and between the lower frame 32 and the lower side inner frame 31B. The conveyance path 33 includes an upper path 34 which is provided at a relatively upper side, a lower path 35 which is provided at a relatively lower side, and a curved path 36 which connects the upper path 34 with the lower path 35. The upper path 34 is a space which extends in the left-right direction between the inner surface of the maintenance cover 9 and the upper side inner frame 31A. The lower path 35 is a space which extends in the left-right direction between the lower side inner frame 31B and the lower frame 32. The curved path 36 is a space which is curved along a circumferential surface of a second LF roller 49 (described later).

Along the conveyance direction in which the sheet S is conveyed in the curved path 33, the image reading apparatus 3 includes a feed unit 41, a pair of sheet width guides 42, a feed roller 43, a separation roller 44, a separation piece 45, a first driven roller 46, a first LF roller 47, an upper reading unit 48, the second LF roller 49, a second driven roller 50, a third driven roller 51, a lower reading unit 52, a pair of discharge rollers 53, and a discharge unit 54.

In the description hereinafter, unless otherwise specified, the maintenance cover 9 is assumed to be at the closed position.

The feed unit 41 is disposed at a lower side of a right end portion of the maintenance cover 9 with a gap. The feed unit 41 extends in an upper right direction. The sheet S which is an image reading target is held across the feed unit 41 and the tray 8 at the tray position.

The pair of sheet width guides 42 are disposed to the feed unit 41. The pair of sheet width guides 42 face each other in the front-rear direction. The pair of sheet width guides 42 are configured to approach each other or separate from each other with the same amount of movement toward or away from a center between them. A distance between the pair of sheet width guides 42 is adjusted to the width of the sheet S in the front-rear direction held on the upper surface of the feed unit 41. The sheet S is inserted between the pair of sheet width guides 42 from a right side. Accordingly, the sheet S is held at the center on the feed unit 41.

The feed roller 43 is held to be rotatable about a rotation axis which extends in the front-rear direction between the inner frame 31 and a driving frame 82 (described later) arranged at a front side of the left side portion 17 of the rear side plate 12. A circumferential surface of the feed roller 43 abuts an upper side of a left end portion of the feed unit 41 in the upper path 34.

The separation roller 44 is arranged at a left side of the feed roller 43. The separation roller 44 is held to be rotatable about a rotation axis which extends in the front-rear direction between the inner frame 31 and the driving frame 82.

The separation piece 45 is arranged at a lower side of the separation roller 44. The separation piece 45 is held by the inner frame 31. In the upper path 34, the separation piece 45 elastically abuts a circumferential surface of the separation roller 44 from a lower side.

The first LF roller 47 is arranged at a left side of the separation roller 44. The first LF roller 47 is held to be rotatable about a rotation axis which extends in the front-rear direction between the inner frame 31 and the driving frame 82.

The first driven roller 46 is arranged at a lower side of the first LF roller 47. The first driven roller 46 is held by the inner frame 31 to be rotatable about a rotation axis which extends in the front-rear direction. A circumferential surface of the first driven roller 46 abuts a circumferential surface of the first LF roller 47 in the upper path 34. The first driven roller 46 is configured to rotate following the rotation of the first LF roller 47.

The upper reading unit 48 includes a contact image sensor module 61, a contact glass 62, and a document pressing member 63.

The contact image sensor module 61 is arranged at a left side of the first LF roller 47. The contact image sensor module 61 is accommodated by a recessed portion 55 which is formed by being recessed to the lower side of the inner frame 31. The contact image sensor module 61 extends in the front-rear direction in the recessed portion 55. The contact image sensor module 61 includes an LED light source, a lens, an image sensor, and the like.

The contact glass 62 is disposed at an upper side of the contact image sensor module 61 to cover the recessed portion 55. An upper surface of the contact glass 62 faces the upper path 34.

The document pressing member 63 is arranged at an upper side of the contact glass 62. The document pressing member 63 is elastically supported by the maintenance cover 9 via an urging member. The document pressing member 63 elastically abuts the upper surface of the contact glass 62 in the upper path 34.

The second LF roller 49 is held to be rotatable about a rotation axis which extends in the front-rear direction between the inner frame 31 and the driving frame 82. The second driven roller 50 is arranged at an upper side of the second LF roller 49. The second driven roller 50 is held by the maintenance cover 9 to be rotatable about a rotation axis which extends in the front-rear direction. A circumferential surface of the second driven roller 50 abuts the circumferential surface of the second LF roller 49 in the curved path 36. The second driven roller 50 is configured to rotate following the rotation of the second LF roller 49.

The third driven roller 51 is arranged at a lower left side of the second LF roller 49. The third driven roller 51 is held by a left end portion of the lower frame 32 to be rotatable about a rotation axis which extends in the front-rear direction. A circumferential surface of the third driven roller 51 abuts the circumferential surface of the second LF roller 49 in the curved path 36. The third driven roller 51 is configured to rotate following the rotation of the second LF roller 49.

The lower reading unit 52 includes a contact image sensor module 64, a contact glass 65, and a document pressing member 66.

The contact image sensor module 64 is disposed in the scanner housing 5 to be movable in the left-right direction. The contact image sensor module 64 extends in the front-rear direction. The contact image sensor module 64 includes an LED light source, a lens, an image sensor, and the like. The contact image sensor module 64 is arranged at a lower side of a left end portion of the contact glass 65 during ADF reading, the non-use time of the image reading apparatus 3, or the like.

The contact glass 65 is disposed to cover an upper surface of the scanner housing 5.

The document pressing member 66 is arranged at an upper side of the left end portion of the contact glass 65. The document pressing member 66 is elastically supported by the lower side inner frame 31B via an urging member. The document pressing member 66 elastically abuts an upper surface of the contact glass 65 in the lower path 35.

The pair of discharge rollers 53 are arranged at a lower side of the left end portion of the feed unit 41. The upper side discharge roller 53 is held to be rotatable about a rotation axis which extends in the front-rear direction between the inner frame 31 and the driving frame 82. The lower side discharge roller 53 is held by the lower frame 32 to be rotatable about a rotation axis which extends in the front-rear direction. A circumferential surface of the lower side discharge roller 53 abuts a circumferential surface of the upper side discharge roller 53 in the lower path 35. The lower side discharge roller 53 is configured to rotate following the rotation of the upper side discharge roller 53.

The discharge unit 54 is disposed at a lower side of the feed unit 41. A left end portion of the discharge unit 54 is disposed at a position lower than an exit of the lower path 35. The discharge unit 54 extends in an upper right direction.

<Image Reading Operation>

When an image on the sheet S is read by the image reading apparatus 3, as shown in FIG. 2, the tray 8 is opened at the tray position and the maintenance cover 9 is closed at the closed position. As described above, the sheet S is held at the center on the feed unit 41 and the tray 8. In this state, an upper surface of the sheet S is referred to as a front surface, and a lower surface of the sheet S is referred to as a back surface.

A leading edge portion of the sheet S is arranged on a circumferential surface lower side of the feed roller 43. When the feed roller 43 rotates clockwise when viewed from a front side, the frictional force between the upper surface of the uppermost sheet S on the feed unit 41 and the circumferential surface of the feed roller 43 causes the sheet S to move between the separation roller 44 and the separation piece 45.

The separation roller 44 rotates clockwise when viewed from a front side. When the leading edge portion of the sheet S is pinched between the separation roller 44 and the separation piece 45, the sheet S is separated sheet by sheet for example, and the separated sheet S passes between the separation roller 44 and the separation piece 45 to be conveyed to the upper path 34.

The first LF roller 47 rotates clockwise when viewed from a front side. The first driven roller 46 rotates counterclockwise when viewed from a front side following the rotation of the first LF roller 47. When the leading edge portion of the sheet S conveyed to the upper path 34 reaches an abutting portion of the circumferential surfaces of the first LF roller 47 and the first driven roller 46, conveyance force is added to the sheet S from the first LF roller 47 and the first driven roller 46.

The sheet S passes between the upper surface of the contact glass 62 and the document pressing member 63. At this time, light is emitted onto the sheet S on the contact glass 62 from the LED light source of the contact image sensor module 61. The light reflected from the sheet S is received by the image sensor of the contact image sensor module 61, and the image on the back surface of the sheet S is read.

Then, the leading edge portion of the sheet S is sent from the upper path 34 to the curved path 36 by the conveyance force added by the first LF roller 47 and the first driven roller 46. The second LF roller 49 rotates counterclockwise when viewed from a front side. The second driven roller 50 and the third driven roller 51 rotate clockwise when viewed from a front side. When the leading edge portion of the sheet S reaches an abutting portion of the circumferential surfaces of the second LF roller 49 and the second driven roller 50, conveyance force is added to the sheet S from the second LF roller 49 and the second driven roller 50. Then, when the leading edge portion of the sheet S reaches the abutting portion of the circumferential surfaces of the second LF roller 49 and the third driven roller 51, conveyance force is added to the sheet S from the second LF roller 49 and the third driven roller 51, and the sheet is sent from the curved path 36 to the lower path 35. Between the second driven roller 50 and the third driven roller, an inner wall surface of the side portion 22 which faces the second LF roller 49 and an inner wall surface of the lower frame 32 form a curved shape to define the curved path 36. Accordingly, the sheet S is conveyed toward the lower path 35.

The sheet S conveyed to the lower path 35 passes between an upper surface of the left end portion of the contact glass 65 and the document pressing member 66. At this time, light is emitted onto the sheet S on the left end portion of the contact glass 65 from the LED light source of the contact image sensor module 64. The light reflected from the sheet S is received by the image sensor of the contact image sensor module 64, and the image on the front surface of the sheet S is read.

The upper side discharge roller 53 rotates counterclockwise when viewed from a front side. The lower side discharge roller 53 rotates clockwise when viewed from a front side following the rotation of the upper side discharge roller 53. When the leading edge portion of the sheet S reaches an abutting portion of the circumferential surfaces of the pair of discharge rollers 53, conveyance force is added to the sheet S from the pair of discharge rollers 53, and the sheet is discharged by the discharge unit 54.

<Pressing Member>

Figure 4:
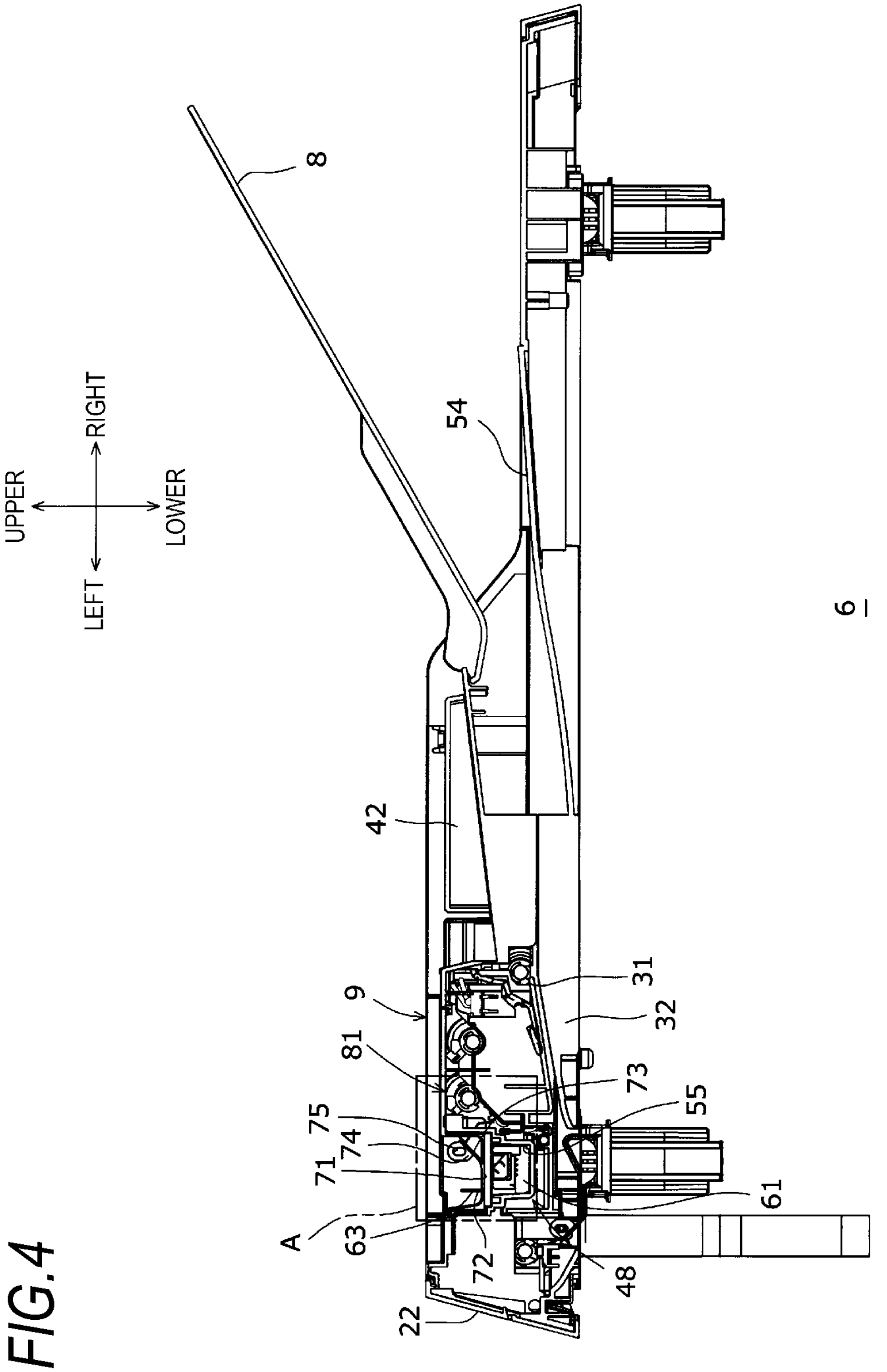
FIG. 4 is a cross-sectional view of a rear end portion of the image reading apparatus 3.

Referring to FIG. 2 and FIG. 4, the pressing member 63 is formed by bending a metal plate. The pressing member 63 has a facing surface 71, a first continuous surface 72, and a second continuous surface 73. The facing surface 71 faces an upper side of the contact glass 62. The first continuous surface 72 extends upward from a left end edge of the facing surface 71. The second continuous surface 73 extends in the upper right direction from a right end edge of the facing surface 71.

Figure 3:
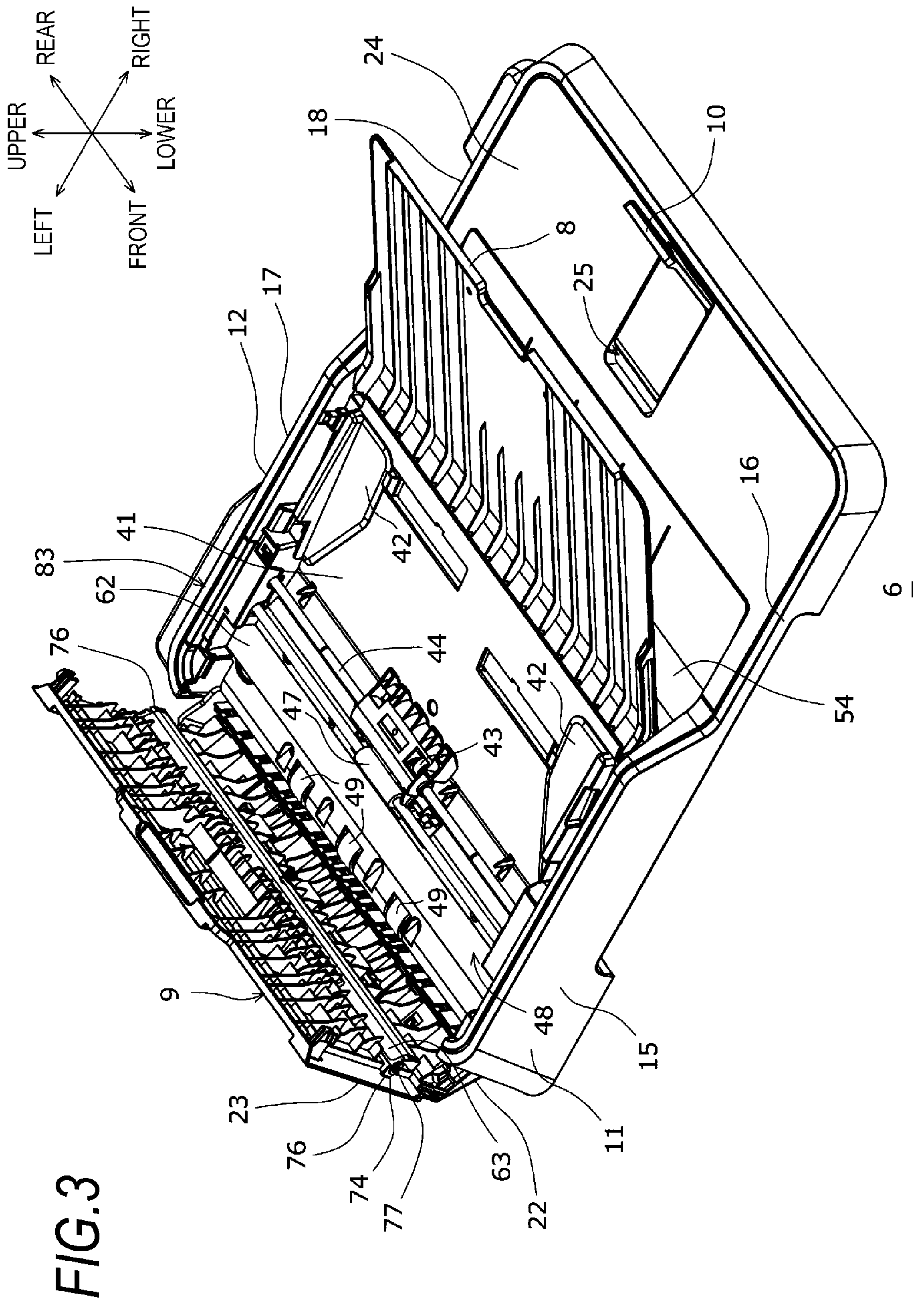
FIG. 3 is a perspective view of an ADF housing 6 of the image reading apparatus 3 when viewed from a front upper right side and shows a state where a tray 8 is at a tray position and a maintenance cover 9 is at an opened position.
Figure 5:
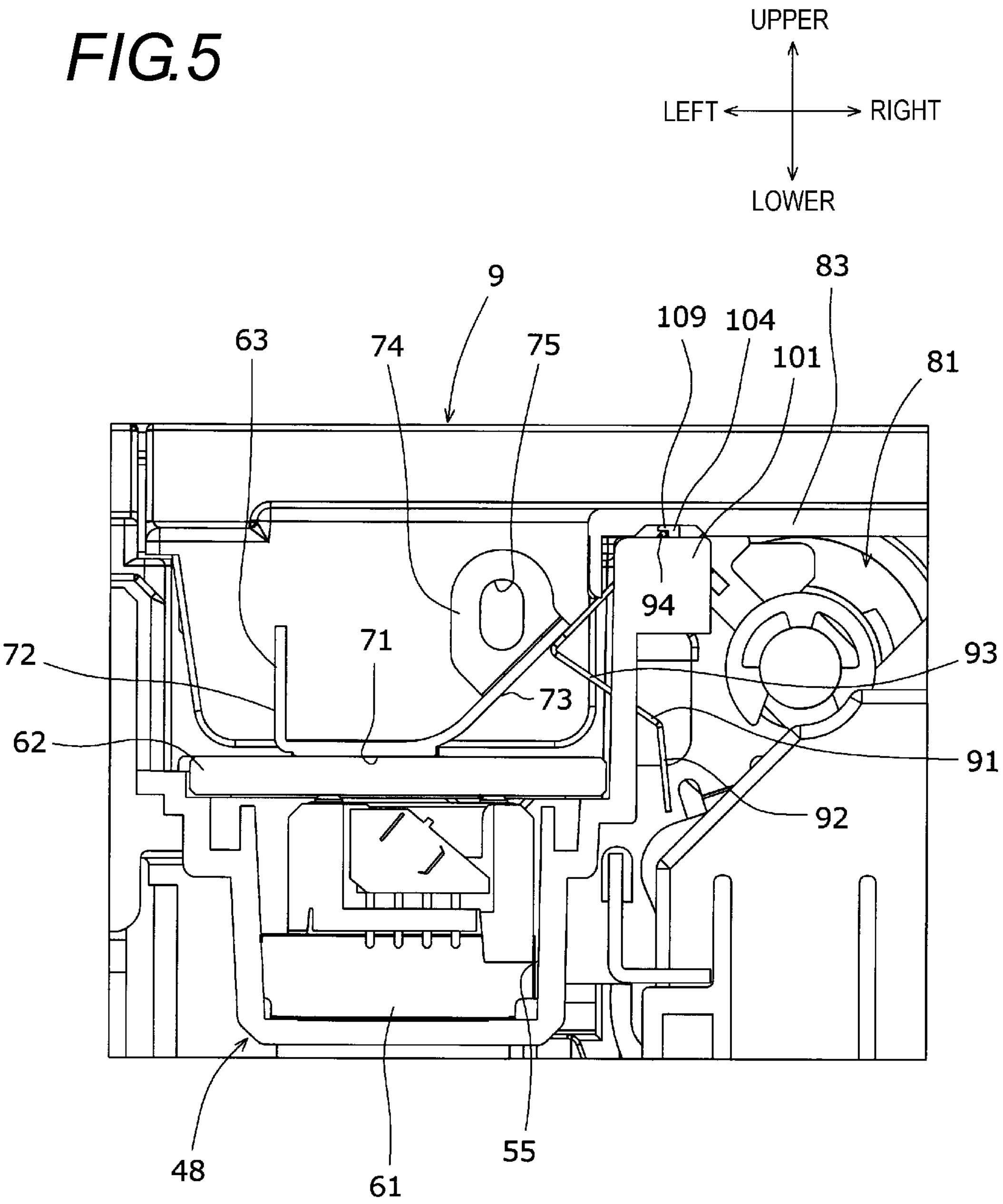
FIG. 5 is an enlarged cross-sectional view of the portion surrounded by the two-dot chain line A shown in FIG. 4.

Also, as shown in FIG. 3, FIG. 4 and FIG. 5, the pressing member 63 includes two mounted portions 74. The mounted portions 74 extend to an upper side from a front end edge and a rear end edge of the second continuous surface 73, respectively. Each mounted portion 74 is formed with an insertion hole 75 which penetrates in the front-rear direction as shown in FIG. 4 and FIG. 5. The insertion hole 75 is long in the upper-lower direction.

As shown in FIG. 3, the maintenance cover 9 includes two mounting portions 76. The mounting portions 76 are disposed inside in the front-rear direction with respect to the respective mounted portions 74. The mounting portions 76 have shaft portions 77 respectively projecting outward in the front-rear direction. Each of the shaft portions 77 is inserted into the insertion hole 75 of the corresponding pressing member 63, and thus the pressing member 63 is mounted on the maintenance cover 9 to be swingable about the shaft portion 77.

Also, as shown in FIG. 2, the maintenance cover 9 includes a projecting portion 78. The projecting portion 78 is disposed at an upper side of the facing surface 71 of the pressing member 63 so as to project from a lower surface of the upper portion 23.

The image reading apparatus 3 includes a coil spring 79 (example of an urging member). The coil spring 79 is wound around the projecting portion 78. The coil spring 79 is disposed in a compressed state between the upper portion 23 of the maintenance cover 9 and the facing surface 71 of the pressing member 63. Therefore, the pressing member 63 is urged to a lower side by the elastic force of the coil spring 79.

<Ground Structure>

Figure 6:
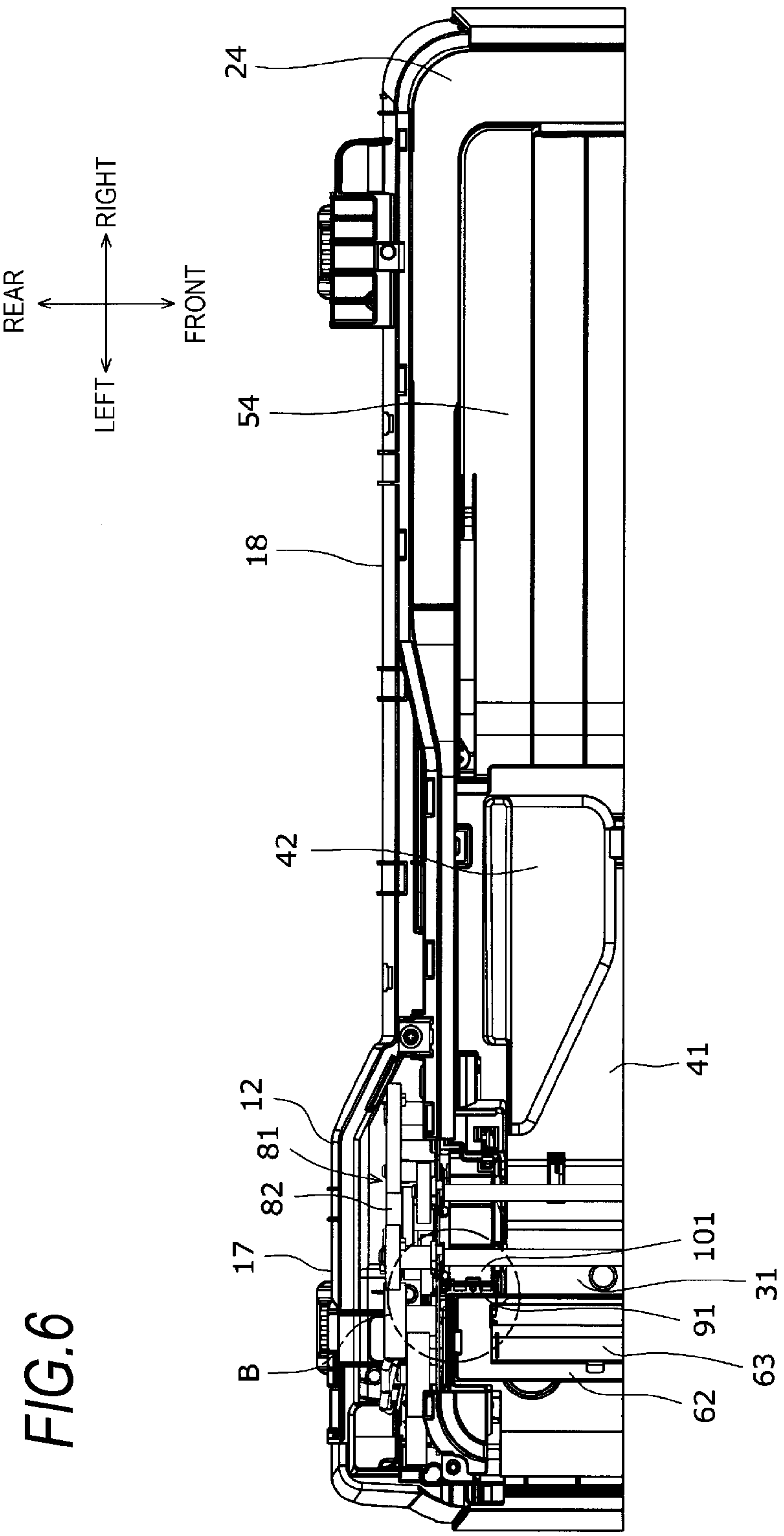
FIG. 6 is a plan view of a rear end portion of the ADF housing 6 and shows a state where the maintenance cover 9 and a driving cover 83 are removed while a pressing member 63 is left.

As shown in FIG. 6, the image reading apparatus 3 includes a driving transmission unit 81. The driving transmission unit 81 includes a gear mechanism and is supported by the driving frame 82 formed of a metal plate. The driving frame 82 is arranged at the front side of the left side portion 17 of the rear side plate 12. The driving frame 82 is connected to a ground. The driving transmission unit 81 transmits the driving force from a motor (not shown) to the feed roller 43, the separation roller 44, the first LF roller 46, the second LF roller 49, and the upper side discharge roller 53.

Also, as shown in FIG. 3 and FIG. 5, the image reading apparatus 3 includes a driving cover 83. The driving cover 83 covers an upper side of the driving transmission unit 81.

As shown in FIG. 5, FIG. 6, FIG. 7, and FIG. 8, the image reading apparatus 3 includes a ground member 91 and a support member 101.

Figure 9:
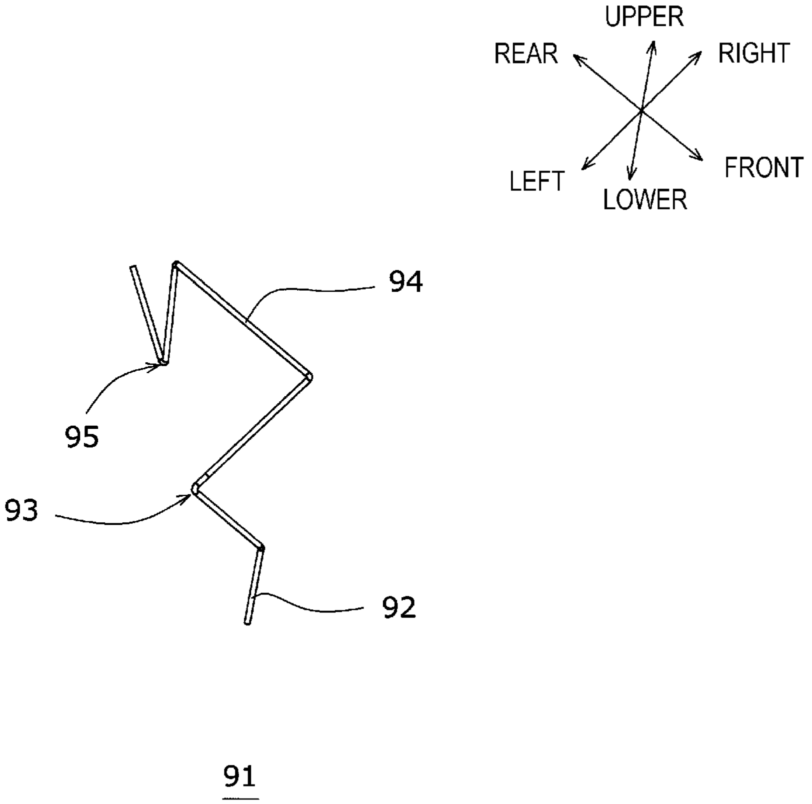
FIG. 9 is a perspective view of a ground member 91 when viewed from a front upper left side.

As shown in FIG. 9, the ground member 91 is formed by bending a metal wire rod. The ground member 91 includes an upper-lower extending portion 92, a first curved portion 93, a front-rear extending portion 94, and a second curved portion 95.

The upper-lower extending portion 92 extends in the upper-lower direction.

The first curved portion 93 extends to an upper left side from an upper end of the upper-lower extending portion 92, and a middle portion is curved to extend to an upper right side.

The front-rear extending portion 94 extends to a rear side from an upper end of the first curved portion 93.

The second curved portion 95 extends to a lower side from a rear end of the front-rear extending portion 94, and a middle portion is curved to extend to an upper rear side.

The support member 101 is integrally formed with the inner frame 31. The support member 101 is disposed at a right side of a rear end portion of the contact glass 62. The support member 101 includes a main body portion 102, a first regulation portion 103, release prevention portions 104, a projection 105, and a second regulation portion 106.

The main body portion 102 extends in the front-rear direction and in the upper-lower direction. In the main body portion 102, two cutout portions 107 are formed away from each other in the front-rear direction. Each of the cutout portions 107 is formed by cutting the main body portion 102 across an upper surface and a right surface thereof.

The first regulation portion 103 is disposed at a front side of the main body portion 102 with a space. The first regulation portion 103 extends in the upper-lower direction in parallel with a front surface of the main body portion 102.

The release prevention portions 104 are disposed in the cutout portions 107 of the main body portion 102, respectively. Each of the release prevention portions 104 has an abutting portion 108 which faces the corresponding cutout portion 107 and extends in the upper-lower direction, and a claw 109 which projects to a left side from an upper end of the abutting portion 108.

The projection 105 projects from an upper surface of the main body portion 102 between the two cutout portions 107. The projection 105 is disposed such that a gap in the left-right direction between a right end of the projection 105 and an imaginary plane F having left surfaces 111 of the abutting portions 108 of the release prevention portion 104 is smaller than the diameter of the ground member 91.

The second regulation portion 106 (example of regulation portion) includes two regulation pieces 110. Each of the regulation pieces 110 projects to a rear side from a rear surface of the main body portion 102, and extends in the upper-lower direction. The two regulation pieces 110 are disposed with a gap in the left-right direction.

The ground member 91 is supported by the support member 101 having the above-mentioned configuration. Specifically, the upper-lower extending portion 92 of the ground member 91 extends in the upper-lower direction at a lower side position than a space between the main body portion 102 and the first regulation portion 103 at a right side of the support member 101. The first curved portion 93 of the ground member 91 is inserted between the main body portion 102 and the first regulation portion 103, and projects to a left side than left surfaces of the main body portion 102 and the first regulation portion 103. The front-rear extending portion 94 of the ground member 91 extends in the front-rear direction below the claws 109 of the two release prevention portions 104 of the support member 101. The front-rear extending portion 94 abuts the left surface 111 of the abutting portion 108 of each of the release prevention portions 104 from a left side, and is arranged to avoid a right side of the projection 105 between the two release prevention portions 104. Accordingly, the front-rear extending portion 94 is pinched by the projection 105 and the left surfaces 111 of the two abutting portions 108. Herein, the projection 105 is disposed such that the left-right direction gap between the right end thereof and the imaginary plane F which has the left surfaces 111 of the abutting portions 108 of the release prevention portion 104 is smaller than the diameter of the ground member 91. Therefore, the front-rear extending portion 94 of the ground member 91 extends between the two release prevention portions 104 while being bent to avoid the projection 105. In this manner, the ground member 91 is unlikely to be misaligned in the front-rear direction with respect to the support member 101.

Figure 7:
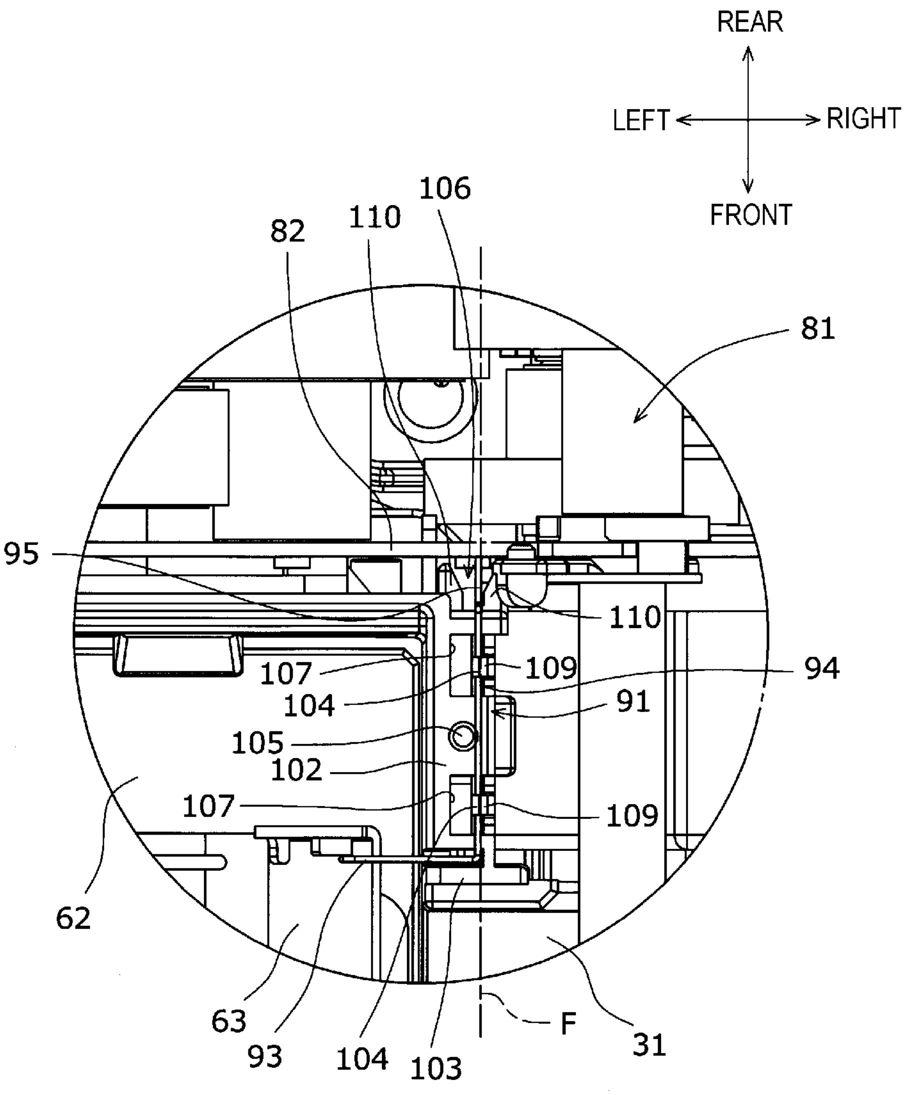
FIG. 7 is an enlarged plan view of the portion surrounded by the two-dot chain line B shown in FIG. 6.
Figure 8:
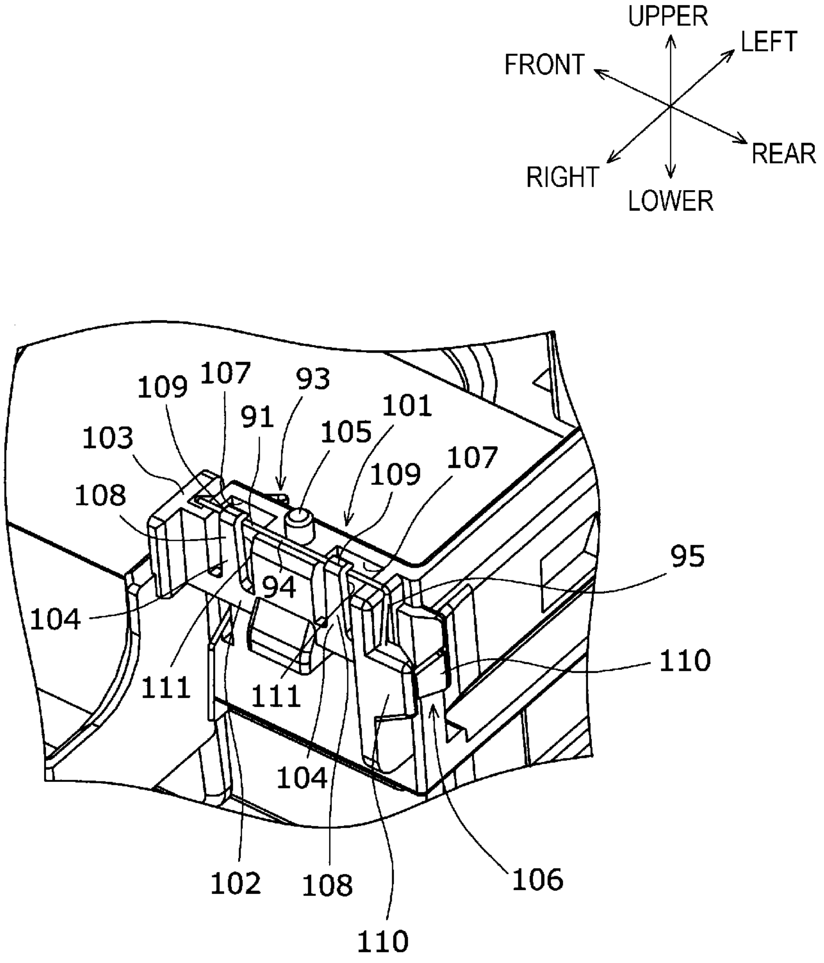
FIG. 8 is a perspective view in the vicinity of a support member 101 of an inner frame 31 of the ADF housing 6 when viewed from a rear upper right side.

Also, the front-rear extending portion 94 is arranged at a lower side of the claw 109, and thus the releasing of the front-rear extending portion 94 from between the projection 105 and the two abutting portions 108 to an upper side is prevented. The second curved portion 95 of the ground member 91 is arranged between the two regulation pieces 110 of the second regulation portion 106 of the support member 101. Therefore, the pivoting of the second curved portion 95 about the front-rear extending portion 94 is regulated. As shown in FIG. 7, a tip end of the second curved portion 95 abuts a front surface of the driving frame 82.

When the maintenance cover 9 is at the closed position, the second continuous surface 73 of the pressing member 63 is in contact with an upper surface of the first curved portion 93 of the ground member 91 as shown in FIG. 5. Accordingly, the pressing member 63 is electrically connected with the driving frame 82 via the ground member 91. As a result, the pressing member 63 has a 0V ground potential.

The first curved portion 93 of the ground member 91 receives force directed to a lower side from the pressing member 63. The pivoting of the second curved portion 95 about the front-rear extending portion 94 is regulated by the second regulation portion 106 of the support member 101, and the first curved portion 93 is deformed by the force received from the pressing member 63. Therefore, the elastic force caused by the deformation is generated in the first curved portion 93. The wire rod forming the ground member 91 is employed such that the elastic force generated in the first curved portion 93 is smaller than the total of the self-weight of the pressing member 63 and the urging force caused by the coil spring 79.

<Operation and Effect>

According to the above configuration, the upper reading unit 48 can be opened by displacing the maintenance cover 9 from the closed position to the opened position. Accordingly, sheet jamming caused in the vicinity of the upper reading unit 48 may be easily removed.

The maintenance cover 9 holds the metal document pressing member 63. When the maintenance cover 9 is at the closed position, the document pressing member 63 faces the upper reading unit 48 across the upper path 34. Therefore, when the image on the sheet S is read, the sheet S is pressed toward the upper reading unit 48 by the document pressing member 63. Accordingly, the sheet S may be brought into close contact with the contact glass 62 of the upper reading unit 48. As a result, the image on the sheet S may be read in high quality by the upper reading unit 48.

When a document passes between the upper reading unit 48 and the document pressing member 63, electric charges would be accumulated in the upper reading unit 48 and the document pressing member 63 due to rubbing with the sheet S. Those electric charges might cause a negative effect to the quality of the reading of the image by the upper reading unit 48.

When the maintenance cover 9 is at the closed position, the ground member 91 is in contact with the document pressing member 63. The ground member 91 is directly connected to the metal driving frame 82. Accordingly, electric charges may be released to the driving frame 82 via the ground member 91 from the document pressing member 63 even when the vicinity of the upper reading unit 48 and the document pressing member 63 are electrically charged. Therefore, deterioration in the quality of the reading caused by the electric charging in the vicinity of the upper reading unit 48 and the document pressing member 63 may be prevented.

Also, when the maintenance cover 9 is at the opened position, the document pressing member 63 and the ground member 91 are separated from each other.

Therefore, hindrance to the movement of the maintenance cover 9 by the ground member 91 may be removed when the maintenance cover 9 is moved. Accordingly, the maintenance cover 9 may be moved smoothly.

The image reading apparatus 3 includes the support member 101 which supports the ground member 91 and is arranged at a position between the document pressing member 63 and the driving frame 82 in the front-rear direction when the maintenance cover 9 is at the closed position. The support member 101 includes the second regulation portion 106 which regulates the movement of the ground member 91.

Therefore, the movement of the ground member 91 is regulated, and the ground member 91 may be stably connected to the document pressing member 63 and the driving frame 82.

Also, the support member 101 includes the release prevention portion 104 which prevents releasing of the ground member 91 to an upper side.

Therefore, the releasing of the ground member 91 from the support member 101 following the maintenance cover 9 may be prevented when the maintenance cover 9 is opened.

The release prevention portions 104 are disposed at two positions with a gap therebetween in the front-rear direction. Each of the release prevention portions 104 includes the abutting portion 108 which abuts the ground member 91 from a right side, and the claw 109 which projects from the left surface 111 of the abutting portion 108 to a left side and abuts the ground member 91 from a side of the maintenance cover 9. The support member 101 includes the projection 105 formed between the two release prevention portions 104. The ground member 91 is disposed to avoid the right side of the projection 105 between the two release prevention portions 104. The projection 105 is disposed such that the left-right direction gap between the right end of the projection 105 and the imaginary plane F which has left surfaces 111 of the abutting portions 108 of the release prevention portion 104 is smaller than the diameter of the ground member 91. Therefore, a part of the ground member 91 is placed at a right side with respect to the imaginary plane F which has the left surfaces 111.

According to this configuration, the ground member 91 is pinched by the left surfaces 111 of the two abutting portions 108 and the projection 105 and the ground member 91 may be supported surely to avoid misalignment. Also, the releasing of the ground member 91 from between the left surfaces 111 of the two abutting portions 108 and the projection 105 may be prevented by the claw 109.

The ground member 91 is formed by bending a metal wire rod. The ground member 91 uses the elasticity of the first curved portion 93 to elastically contact the document pressing member 63.

According to this configuration, when the maintenance cover 9 is moved from the opened position to the closed position, the ground member 91 may be brought into contact following the movement of the maintenance cover 9 by the deformation of the ground member 91. As a result, the ground member 91 may suitably come in contact with the document pressing member 63.

The document pressing member 63 is formed by bending a metal plate. The document pressing member 63 includes the facing surface 71 which faces the upper reading unit 48 when the maintenance cover 9 is at the closed position, and the second continuous surface 73 which is continuous to the facing surface 71 and is brought into contact by the portion of the ground member 91 which extends in a straight line shape when the maintenance cover 9 is at the closed position.

According to this configuration, the sheet S may be pressed toward the upper reading unit 48 by the facing surface 71 of the document pressing member 63. Since the ground member 91 is in contact with the second continuous surface 73 of the document pressing member 63, hindrance to the conveyance of the sheet S by the ground member 91 and impediment to the pressing of the sheet S by the facing surface 71 by the ground member 91 may be avoided.

The document pressing member 63 is urged toward the upper reading unit 48 by the coil spring 79. The ground member 91 is designed such that the elastic force generated in the first curved portion 93 is smaller than the total of the self-weight of the pressing member 63 and the urging force caused by the coil spring 79 when the first curved portion 93 and the document pressing member 63 are in contact with each other.

According to this configuration, the rising of the document pressing member 63 from the upper reading unit 48 by the elastic force generated in the first curved portion 93 of the ground member 91 may be inhibited. Therefore, the sheet S may be stably pressed toward the upper reading unit 48 by the document pressing member 63.

MODIFIED EXAMPLE

While the present invention has been shown and described with reference to certain illustrative embodiments thereof, it will be understood by those skilled in the art that various changes in form and details may be made therein without departing from the spirit and scope of the invention as defined by the appended claims.

For example, in the above-described illustrative embodiment, the image reading apparatus 3 has a configuration in which the images on both surfaces of the sheet S may be read while the sheet S is conveyed. However, the present invention may be applied to an image reading apparatus which has a configuration in which the image on one of the surfaces of the sheet S is read while the sheet S is conveyed.

What is claimed is:

1. An image reading apparatus comprising:

a conveyor configured to convey a document along a conveyance path;

a first reading unit configured to read an image on the document which is conveyed in a predetermined conveyance direction in the conveyance path;

a cover disposed to be movable between an opened position where the first reading unit is opened and a closed position where the first reading unit is covered;

a metal pressing member held by the cover and comprising a facing surface configured to face the first reading unit with the conveyance path interposed therebetween and press the document toward the first reading unit when the cover is at the closed position, and an inclined surface inclined with respect to the facing surface and disposed upstream with respect to the facing surface in the conveyance direction;

a metal frame supporting the conveyor and configured to face the pressing member in a width direction orthogonal to the conveyance direction when the cover is at the closed position;

a ground member formed by bending a metal wire rod and comprising:

a first end portion directly connected to the frame;

a second end portion configured to be separated from the inclined surface of the pressing member when the cover is at the opened position, and to be in contact with the inclined surface of the pressing member when the cover is at the closed position; and an intermediate portion disposed between the first end portion and the second end portion; and a support portion supporting the intermediate portion of the ground member and disposed at a position between the pressing member and the metal frame in the width direction when the cover is at the closed position, wherein, when the cover is moved from the opened position to the closed position, the inclined surface of the pressing member is configured to contact the second end portion from an upper side.

2. The image reading apparatus according to claim 1, wherein the support portion comprises a regulation portion configured to regulate a movement of the ground member.

3. The image reading apparatus according to claim 1, wherein the support portion comprises a release prevention portion configured to prevent releasing of the ground member toward the cover.

4. The image reading apparatus according to claim 3, wherein the release prevention portion comprises two release prevention portions disposed at two positions, respectively, with a gap therebetween in the width direction, and wherein each of the release prevention portions comprises:

an abutting surface abutting the ground member from one side of the conveyance direction, and a claw projecting to the other side in the conveyance direction from the abutting surface to abut the ground member from a side of the cover, wherein the support portion comprises a projection formed between the two release prevention portions, and wherein the ground member is disposed to avoid the projection to the one side in the conveyance direction such that at least a part of the ground member between the two release prevention portions is placed at the one side in the conveyance direction with respect to an imaginary plane which has the abutting surface.

5. The image reading apparatus according to claim 1, wherein the ground member comprises a curved portion formed by bending the metal wire rod, and is configured to elastically contact the pressing member using an elasticity of the curved portion.

6. The image reading apparatus according to claim 5, wherein the pressing member is formed by bending a metal plate.

7. The image reading apparatus according to claim 5, further comprising:

an urging member configured to apply an urging force to the pressing member toward the first reading unit when the cover is at the closed position, wherein the ground member is configured such that an elastic force generated in the curved portion is smaller than a total of a self-weight of the pressing member and the urging force of the urging member when the curved portion and the pressing member are in contact with each other.

8. The image reading apparatus according to claim 1, wherein the conveyance path has a U-shape comprising an upper path provided at an upper side and a lower path provided at a lower side, wherein the first reading unit is disposed at a lower side of one of the upper path and the lower path, and configured to read an image on the document conveyed in the one of the upper path and the lower path, and wherein the image reading apparatus further comprises:

a second reading unit disposed at a lower side of the other one of the upper path and the lower path, and configured to read an image on the document conveyed in the other one of the upper path and the lower path.

9. A sheet conveyance apparatus comprising:

a conveyor configured to convey a document along a conveyance path, the conveyance path comprising an upper path, a lower path, and a curved path connecting the upper path and the lower path;

a cover disposed to be movable between a first position where the cover forms a part of the upper path and a second position where the upper path is opened;

a metal guide portion disposed to the cover and configured to form a part of the upper path when the cover is at the first position, such that the document conveyed by the conveyor is configured to contact the guide portion, wherein the guide portion comprises:

a facing surface configured to form a part of the upper path when the cover is at the first position; and an inclined surface inclined with respect to the facing surface and disposed upstream with respect to the facing surface in a conveyance direction of the conveyor;

a metal frame supporting the conveyor and configured to face the guide portion in a width direction orthogonal to the conveyance direction of the conveyor when the cover is at the first position; and a ground member formed by bending a metal wire rod and comprising:

a first end portion directly connected to the metal frame;

a second end portion configured to be separated from the inclined surface of the guide portion when the cover is at the second position and to be in contact with the inclined surface of the guide portion when the cover is at the first position; and an intermediate portion disposed between the first end portion and the second end portion; and a support portion supporting the intermediate portion of the ground member and disposed at a position between the guide portion and the metal frame in the width direction when the cover is at the first position, wherein, when the cover is moved from the second position to the first position, the inclined surface of the guide portion is configured to contact the second end portion from an upper side.

10. The sheet conveyance apparatus according to claim 9, wherein ground member comprises a curved portion formed by bending the metal wire rod, and is configured to elastically contact the guide portion using an elasticity of the curved portion.

11. The sheet conveyance apparatus according to claim 10, wherein the guide portion is formed by bending a metal plate.

12. An image reading apparatus comprising:

a conveyor configured to convey a document along a conveyance path;

a first reading unit configured to read an image on the document which is conveyed in a predetermined conveyance direction in the conveyance path;

a cover disposed to be movable between an opened position where the first reading unit is opened and a closed position where the first reading unit is covered;

a metal pressing member held by the cover and configured to face the first reading unit with the conveyance path interposed therebetween and press the document toward the first reading unit when the cover is at the closed position;

a metal frame supporting the conveyor and configured to face the pressing member in a width direction orthogonal to the conveyance direction when the cover is at the closed position;

a ground member directly connected to the frame and configured to be separated from the pressing member when the cover is at the opened position, and to be in contact with the pressing member when the cover is at the closed position; and a support portion supporting the ground member and disposed at a position between the pressing member and the metal frame in the width direction when the cover is at the closed position, wherein the support portion comprises a release prevention portion configured to prevent releasing of the ground member toward the cover, wherein the release prevention portion comprises two release prevention portions disposed at two positions, respectively, with a gap therebetween in the width direction, wherein each of the release prevention portions comprises:

an abutting surface abutting the ground member from one side of the conveyance direction, and a claw projecting to the other side in the conveyance direction from the abutting surface to abut the ground member from a side of the cover, wherein the support portion comprises a projection formed between the two release prevention portions, and wherein the ground member is disposed to avoid the projection to the one side in the conveyance direction such that at least a part of the ground member between the two release prevention portions is placed at the one side in the conveyance direction with respect to an imaginary plane which has the abutting surface.

* * * * *